Feb. 17, 1925. 1,526,821
J. C. ANDREWS
MEANS FOR PROTECTING EAVES TROUGHS
Filed Sept. 10, 1920
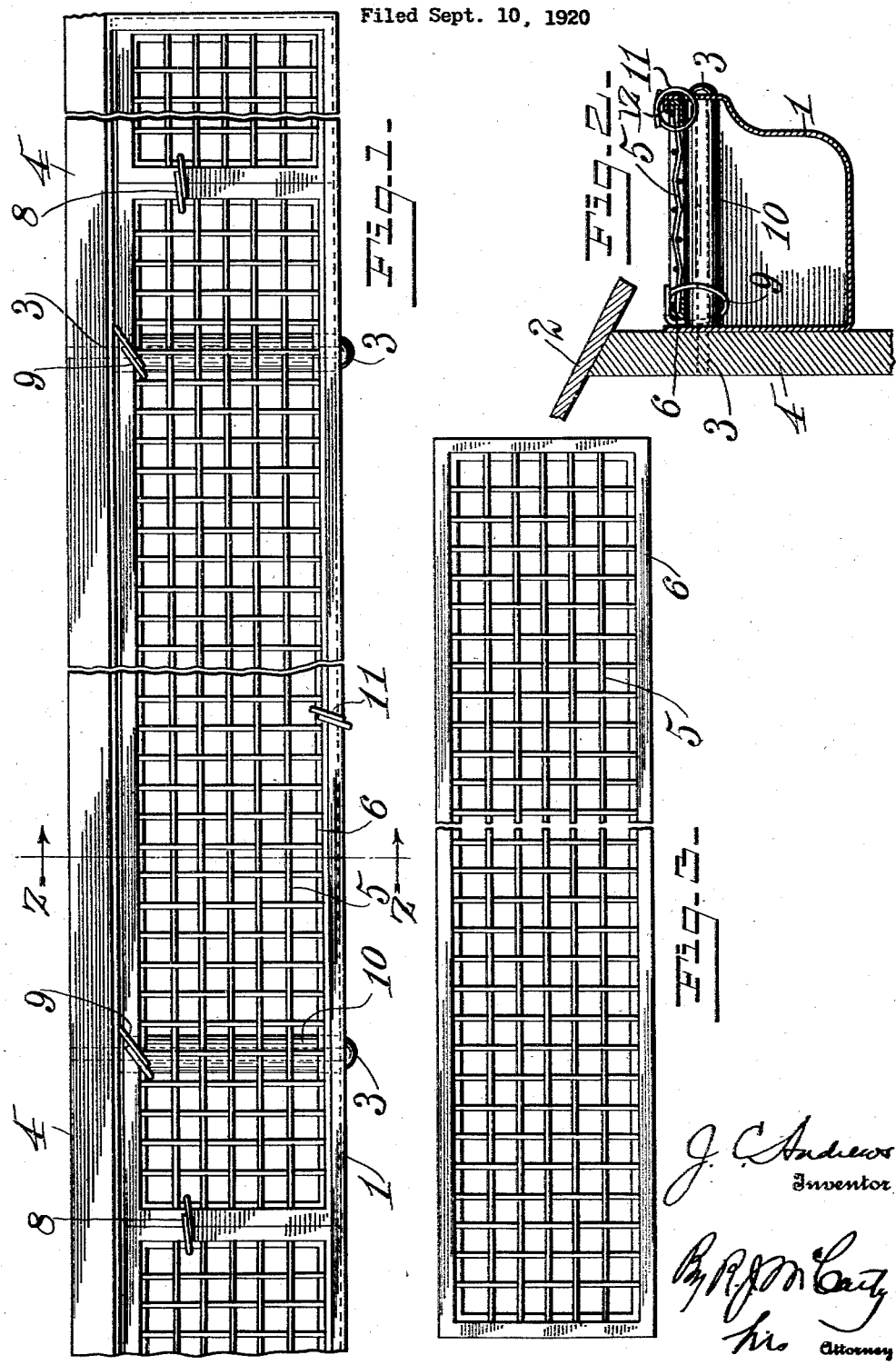

Patented Feb. 17, 1925.

1,526,821

UNITED STATES PATENT OFFICE.

JAMES C. ANDREWS, OF DAYTON, OHIO.

MEANS FOR PROTECTING EAVES TROUGHS.

Application filed September 10, 1920. Serial No. 409,357.

*To all whom it may concern:*

Be it known that I, JAMES C. ANDREWS, a citizen of the United States, residing at Dayton, in the county of Montgomery and State of Ohio, have invented certain new and useful Improvements in Means for Protecting Eaves Troughs, of which the following is a specification.

This invention relates to certain improvements in eaves troughs and consists more specifically to means for preventing accumulations of rubbish in the trough during dry weather, which clogs it up and causes the trough to overflow more or less during rainy weather. For example, birds are accustomed to build their nests in the gutters or troughs of buildings, and other foreign substances accumulate therein to such an extent as to prevent the free flow of water from the gutter or trough to the down pipe.

The object of the present invention is to provide means for preventing these accumulations in eaves troughs, and to thus render unnecessary the cleaning of the trough from time to time.

The particular means to be hereinafter described consists in placing a wire screen of suitable mesh which is secured above in the top of the trough or in the mouth thereof as will hereinafter more fully appear from the accompanying drawings and the description in connection therewith.

Referring to the drawings more in general terms, Fig. 1 is a plan view of a portion of an eaves trough having my invention applied thereto, parts of the trough being broken away as well as parts of the screen; Fig. 2 is a cross sectional view through Fig. 1 on the line 2—2, and Fig. 3 is a plan view of the screen removed from the trough, parts of the screen being broken away.

In a detail description of the invention similar reference characters indicate corresponding parts.

The eaves trough —1— is of the usual form, and the same is arranged along the eaves of a building where the roof —2— directs the rain into the trough. As is common in gutters or troughs of this character, they are stiffened by flanges 12 extending inwardly from the upper edges of the outer walls thereof and are strengthened at uniform points throughout their length by cross braces such as tubular members —10— through which bolts —3— pass and unite the trough to the side of the building as in Fig. 2. The tubes —10— and the bolts—3— add strength to the trough and serve to unite it to the side —4— of the building in a firm and substantial manner. The screen as shown in Fig. 2 consists of a suitable wire mesh —5— having sufficient spaces between the wires to provide ample inlets for the water to the trough, and yet the openings are of a character that prevent birds from entering the trough and building their nests therein as well as other foreign matter from entering the trough to cause a stoppage of water therein. The wire mesh is inclosed by a metallic margin or frame —6— in the form of a plate frame which is made by bending the metal over upon itself and clamping it onto the ends of the wire. This adds strength to the structure and serves to hold it free from warping in the mouth of the trough as shown in Fig. 2. The screen thus formed is preferably made in sections so as to prevent further liability of any possible warping of the structure, and when placed in the mouth of the trough these sections are united at their ends by tie wires —8—, the ends abutting closely and forming tight connections at these points. The sections of the screen so united lie in the mouth of the trough and are united in position within the mouth of the trough by tie wires —9— which unite the inner sides of the screen to the tubular members —10— through which the rods —3— pass and unite the trough to the side of the building as hereinbefore specified. The outer edges of the screen sections extend beneath the flange 12 at the upper edge of the outer wall of the trough and are in a similar manner secured by tie wires —11— which pass through openings in the outer side of the trough near the top at suitable points and are bent over the outer margin of the frame of the screen.

By this means the trough is prevented from being stopped up in dry weather by such accumulations of matter as might otherwise form therein, and an annoyance commonly experienced with eaves troughs is prevented, the trough being protected by the screen throughout.

The screen being formed of sections prevents any displacement thereof which might be caused by warping, and also any openings that might permit birds to enter the trough.

Having described my invention, I claim:

The combination with an eaves trough having a flange extending inwardly from the upper edge of the outer wall thereof, and supporting members extending through the inner and outer walls of said trough and spaced below said flange, of a screen comprising a plurality of flat sections of wire mesh resting upon said supporting members, extending beneath said flange and arranged end to end, each section comprising a rigid supporting frame secured to the edges of said wire mesh and means for securing said sections in position within said trough.

In testimony whereof I affix my signature.

JAMES C. ANDREWS.